(12) United States Patent
Shen

(10) Patent No.: US 11,997,624 B2
(45) Date of Patent: May 28, 2024

(54) SEARCH SPACE CONFIGURATION METHOD AND APPARATUS, AND COMMUNICATIONS DEVICE

(71) Applicant: VIVO MOBILE COMMUNICATION CO., LTD., Chang'an Dongguan (CN)

(72) Inventor: Xiaodong Shen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 162 days.

(21) Appl. No.: 17/485,900

(22) Filed: Sep. 27, 2021

(65) Prior Publication Data

US 2022/0015049 A1    Jan. 13, 2022

Related U.S. Application Data

(63) Continuation of application No. PCT/CN2020/081023, filed on Mar. 25, 2020.

(30) Foreign Application Priority Data

Mar. 27, 2019   (CN) .......................... 201910239500.3

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 8/005* (2013.01); *H04W 72/0446* (2013.01); *H04W 72/23* (2023.01)

(58) Field of Classification Search
CPC .................................................. H04W 56/001
See application file for complete search history.

(56) References Cited

U.S. PATENT DOCUMENTS

2017/0331670 A1* 11/2017 Parkvall ............... H04B 7/0695
2018/0249497 A1   8/2018 Noh et al.
(Continued)

FOREIGN PATENT DOCUMENTS

| CN | 108347778 A | 7/2018 |
| CN | 110635877 A | 12/2019 |
| KR | 20180064455 A | 6/2018 |

OTHER PUBLICATIONS

Extended European Search Report for 20777035.5; dated Apr. 26, 2022.

(Continued)

*Primary Examiner* — Guang W Li
(74) *Attorney, Agent, or Firm* — von Briesen & Roper, s.c.

(57) ABSTRACT

This disclosure provides a search space configuration method and apparatus, and a communications device, and relates to the field of wireless communications technologies. The search space configuration method is applied to user equipment and includes: monitoring at least one synchronization signal block; obtaining configuration information of a search space corresponding to a detected synchronization signal block, where the configuration information includes QCL modulus information and/or information about a discovery reference signal transmission window; and determining a position of a search space for a physical downlink control channel PDCCH based on time synchronization information of the detected synchronization signal block and the configuration information.

18 Claims, 4 Drawing Sheets

(51) Int. Cl.
  *H04W 8/00*       (2009.01)
  *H04W 72/0446*    (2023.01)
  *H04W 72/23*      (2023.01)

(56) References Cited

U.S. PATENT DOCUMENTS

| | | | |
|---|---|---|---|
| 2018/0279135 A1 | 9/2018 | Hwang et al. | |
| 2018/0324843 A1* | 11/2018 | Lee | H04W 72/23 |
| 2019/0058519 A1 | 2/2019 | Davydov et al. | |
| 2019/0098590 A1* | 3/2019 | Nam | H04W 72/23 |
| 2019/0327767 A1* | 10/2019 | Islam | H04L 27/2666 |
| 2019/0349170 A1* | 11/2019 | Li | H04L 5/003 |
| 2019/0356524 A1* | 11/2019 | Yi | H04L 27/26025 |
| 2019/0394749 A1* | 12/2019 | Islam | H04W 24/08 |
| 2020/0107337 A1* | 4/2020 | Lin | H04L 1/0026 |
| 2020/0154449 A1* | 5/2020 | Akkarakaran | H04L 5/0064 |
| 2020/0154489 A1* | 5/2020 | Zhou | H04W 72/23 |
| 2020/0162198 A1* | 5/2020 | Seo | H04L 5/0091 |
| 2020/0196306 A1* | 6/2020 | Si | H04L 5/001 |
| 2020/0366452 A1* | 11/2020 | Tang | H04L 5/0057 |
| 2021/0007072 A1* | 1/2021 | Wu | H04L 5/0053 |
| 2021/0185652 A1* | 6/2021 | Rune | H04L 5/0053 |
| 2022/0015049 A1* | 1/2022 | Shen | H04W 56/001 |
| 2022/0061105 A1* | 2/2022 | He | H04W 74/008 |
| 2022/0095253 A1* | 3/2022 | Harada | H04L 5/0053 |
| 2022/0174624 A1* | 6/2022 | Wu | H04L 5/0053 |
| 2023/0090685 A1* | 3/2023 | Noh | H04L 5/0048 |
| | | | 370/329 |

OTHER PUBLICATIONS

R1-1812300: Source Vivo "Discussion on the channel access procedures", 3GPP TSG RAN WG1 Meeting #95, Spokane, USA, Nov. 12-16, 2018.
R1-1900111: Source Vivo "Discussion on enhancements to initial access procedure", 3GPP TSG RAN WG1 Meeting 1901, Taipel, Jan. 21-25, 2019.
Japanese Office Action related to Application No. 2021-557445 dated Jul. 26, 2022.
R1-1901676—Source: vivo "Discussion on Enhancements to Initial Access Procedure", Agenda Item: 7.2.2.2.2, Document for: Discussion and Decision, 3GPP TSG RAN WG1 #96, Athens, Greece, Feb. 25-Mar. 1, 2019.
R1-1902786—Source: NTT Docomo, Inc. "Initial Access Signals and Channels for NR-U", Agenda Item: 7.2.2.1.1, Document for: Discussion and Decision, 3GPP TSG RAN WG1 #96, Athens, Greece, Feb. 25-Mar. 1, 2019.
PCT International Search Report and Written Opinion for PCT/CN2020/081023; dated Jun. 23, 2020.
Qualcomm Incorporated; "Common control resource set signaling in MIB", 3GPP TSG RAN WG1#89, Hangzhou, P.R. China, May 15-19, 2017, R1-1708611.
South Korean Request for the Submission of an Opinion for related Application No. 10-2021-7034980; reported on Mar. 25, 2024.
3rd Generation Partnership Project, "Technical Specification Group Radio Access Network; NR; Radio Resource Control (RRC) protocol specification", Release Mar. 15, 2019, 3GPP TS 38.331 V15.54.0.

* cited by examiner

SEARCH SPACE CONFIGURATION METHOD AND APPARATUS, AND COMMUNICATIONS DEVICE

CROSS-REFERENCE TO RELATED APPLICATIONS

This application is a continuation of PCT Application No. PCT/CN2020/081023 filed on Mar. 25, 2020, which claims priority to Chinese Patent Application No. 201910239500.3, filed in China on Mar. 27, 2019, which is incorporated herein by reference in its entirety.

TECHNICAL FIELD

This disclosure relates to the field of wireless communications technologies, and in particular, to a search space configuration method and apparatus, and a communications device.

BACKGROUND

In discussion of standards of a new radio (NR) access technology for 5G, user equipment (UE) needs to listen to a plurality of types of downlink control information (DCI). By using blind detection, the UE may detect, in a search space for the UE, a physical downlink control channel (PDCCH) transmitted by a network-side device to obtain the DCI.

In a licensed communications system of 5G, a search space is in a fixed slot. However, in an unlicensed communications system of 5G, a search space is related to a position at which clear channel assessment is successfully performed. Therefore, the search space is flexibly located, and configuration of a search space and a receiving method at a fixed time position on a licensed frequency band are not applicable to the licensed frequency band. How to configure a flexible search space in the unlicensed communications system of 5G is an urgent problem to be resolved.

SUMMARY

According to a first aspect, an embodiment of this disclosure provides a search space configuration method that is applied to user equipment and includes:

monitoring at least one synchronization signal block;

obtaining configuration information of a search space corresponding to a detected synchronization signal block, where the configuration information includes QCL modulus information and/or information about a discovery reference signal transmission window; and determining a position of a search space for a physical downlink control channel PDCCH based on time synchronization information of the detected synchronization signal block and the configuration information.

According to a second aspect, an embodiment of this disclosure provides a search space configuration method that is applied to a network-side device and includes:

sending a synchronization signal block and configuration information of a search space corresponding to the synchronization signal block to user equipment, where the configuration information is used to indicate a position of a search space for a PDCCH, and the configuration information includes QCL modulus information and/or information about a discovery reference signal transmission window.

According to a third aspect, an embodiment of this disclosure provides a search space configuration apparatus that is applied to user equipment and includes:

a monitoring module, configured to monitor at least one synchronization signal block;

an obtaining module, configured to obtain configuration information of a search space corresponding to a detected synchronization signal block, where the configuration information includes QCL modulus information and/or information about a discovery reference signal transmission window; and a processing module, configured to determine a position of a search space for a physical downlink control channel PDCCH based on time synchronization information of the detected synchronization signal block and the configuration information.

According to a fourth aspect, an embodiment of this disclosure provides a search space configuration apparatus that is applied to a network-side device and includes:

a sending module, configured to send a synchronization signal block and configuration information of a search space corresponding to the synchronization signal block to user equipment, where the configuration information is used to indicate a position of a search space for a PDCCH, and the configuration information includes QCL modulus information and/or information about a discovery reference signal transmission window.

According to a fifth aspect, an embodiment of this disclosure provides a communications device, including a memory, a processor, and a computer program stored in the memory and capable of running on the processor, where when the computer program is executed by the processor, the steps of the foregoing search space configuration method are implemented.

According to a sixth aspect, an embodiment of this disclosure provides a computer-readable storage medium, where the computer-readable storage medium stores a computer program, and when the computer program is executed by a processor, the steps of the foregoing search space configuration method are implemented.

DESCRIPTION OF EMBODIMENTS

Figure 1:
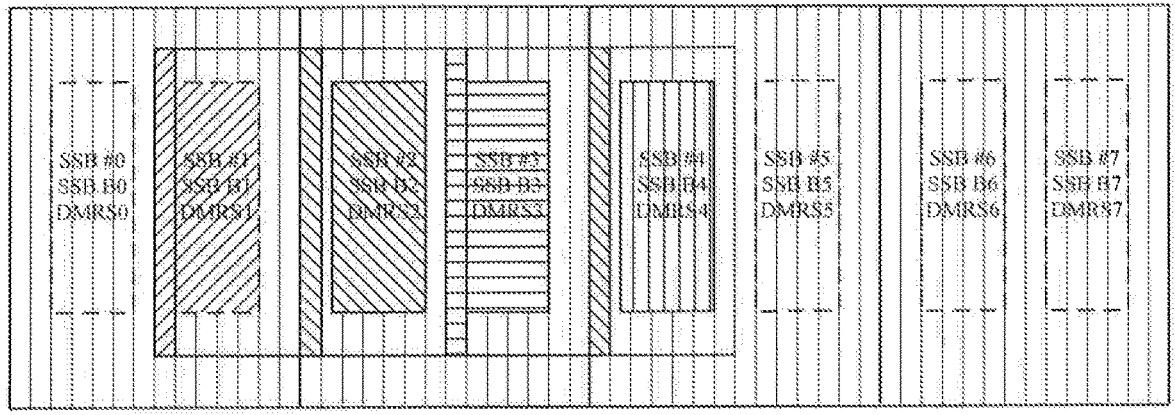
FIG. 1 is a schematic diagram of SSBs that are in a same quasi co-located beam direction and that are transmitted at different time positions.

To make the to-be-resolved technical problems, technical solutions, and advantages of the embodiments of this disclosure clearer, the following provides detailed descriptions with reference to the accompanying drawings and specific embodiments.

In the new radio (NR) Rel 15, configuration information of a search space for system information is sent on a synchronization signal block (SSB) and/or physical broadcast channel (PBCH). For a frequency band below 6 GHz, resources of the SSB/PBCH and a Type-0 (Type0) physical downlink control channel (PDCCH) use a multiplexing pattern 1, in other words, the SSB/PBCH and the Type-0 PDCCH cannot overlap in time domain. In this pattern, UE may monitor the Type-0 PDCCH in an $n_0^{th}$ slot, where $n_0$ meets the following condition: For an SSB index i, $n_0 = (O \cdot 2^\mu + \lfloor i \cdot M \rfloor) \bmod N_{slot}^{frame,\mu}$ that is in a frame with an even number if satisfying $[(O \cdot 2^{\mu + \lfloor i \cdot M \rfloor})/N_{slot}^{frame,\mu}] \bmod 2 = 0$, and that is in a frame with an odd number if satisfying $[(O \cdot 2^\mu + \lfloor i \cdot M \rfloor)/N_{slot}^{frame,\mu}] \bmod 2 = 1$. Values of M and O are provided in Table 1.

TABLE 1

Type-0 PDCCH configuration table

| Index | O | Number of search space sets per slot | M | First symbol index |
|---|---|---|---|---|
| 0 | 0 | 1 | 1 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

Therefore, in a licensed communications system of 5G, provided that a configuration index is determined, each Type-0 PDCCH associated with an SSB is configured with a time-domain periodicity of two consecutive fixed slots.

The following is a plurality of common search space sets that are defined in the NR Rel 15.

Type-0 PDCCH common search space (CSS) set (set): configured by pdcch-ConfigSIB1 in master information block (MIB) information or by searchSpaceSIB1 in PDCCH-ConfigCommon, and used for detecting, on a primary cell of a master cell group (MCG), downlink control information DCI) that is scrambled by a system information-radio network temporary identifier (System Information-Radio Network Temporary Identity, SI-RNTI) for scheduling remaining minimum system information (RMSI).

Type-0A PDCCH CSS set: configured by searchSpaceOtherSystemInformation in PDCCH-ConfigCommon, and used for detecting, on a primary cell of an MCG, DCI that is scrambled by an SI-RNTI for scheduling other system information (OSI).

Type-1 PDCCH CSS set: configured by ra-SearchSpace in PDCCH-ConfigCommon, and used for detecting, on a primary cell, DCI that is scrambled by a random access (RA)-RNTI for scheduling a message 2 (msg2) or DCI that is scrambled by a temporary cell (TC)-RNTI for scheduling a message 3 (msg3).

Type-2 PDCCH CSS set: configured by paging-SearchSpace in PDCCH-ConfigCommon, and used for detecting, on a primary cell of an MCG, DCI that is scrambled by a paging (P)-RNTI for scheduling paging information.

If an active downlink (DL) bandwidth part (BWP) and an initial DL BWP have same subcarrier spacing (SCS) and a same cyclic prefix (CP) length, and the configured active DL BWP includes all resource blocks (RBs) of the initial DL BWP, coreset #0 and searchspace #0 may be configured, and in this case, a CORESET and a search space for the Type-0 PDCCH CSS set are set to coreset #0 and searchspace #0 respectively.

If searchspaceID is set to 0 in PDCCH-ConfigCommon for the Type-0/0A/1/2 PDCCH CSS set, UE performs PDCCH monitoring based on the configuration of coreset #0 and searchspace #0.

When a communications system runs on an unlicensed frequency band, user equipment or a network-side device needs to perform clear channel assessment (CCA) and/or extended clear channel assessment (eCCA) to listen to a channel before sending information, in other words, to perform energy detection (ED). When energy is lower than a specific threshold, transmission can be started only when it is determined that the channel is clear. The unlicensed frequency band supports sharing by a plurality of technologies or a plurality of transmission nodes. Therefore, such a contention-based access manner leads to uncertainty of available time of a channel. When the channel is available, a position available for transmission of a signal on a network side may have been missed and therefore transmission cannot be performed. In this case, a receive end may not be able to normally receive a signal configured on the network side, and not be able to conduct a terminal behavior (for example, PDCCH monitoring, or monitoring and measurement of a wireless environment) based on configuration on the network side after the signal is received.

Therefore, in an unlicensed communications system, an SSB/PBCH, a Type-0 PDCCH, and system information can be sent only after the clear channel assessment is performed. To send such broadcast information more effectively, these signals are usually collected together in the unlicensed communications system, for example, a discovery reference signal (DRS). In this way, all these signals can be sent successfully after the clear channel assessment is performed only once. In addition, due to importance of such information, a plurality of candidate positions needs to be introduced in one transmission window to ensure a transmission probability of the information. As shown in FIG. 1, SSBs in a same quasi co-located (QCL) beam direction may be transmitted at different time positions.

Compared with an unlicensed communications system using 4G licensed-assisted access (LAA), a main target scenario of an unlicensed communications system of 5G is independent deployment. Therefore, a DRS needs to include system information, and a search space for the system information is configured on an SSB/PBCH. As described above, in a licensed communications system of 5G, a search space is in a fixed slot. However, in the unlicensed communications system of 5G, a DRS position is related to a position at which clear channel assessment is successfully performed, and transmission time of the system information changes with busy and idle states of a channel. Therefore, the search space is flexibly located, and configuration of a search space and a receiving method at a fixed time position on a licensed frequency band are not applicable to the licensed frequency band. How to configure a flexible search space in the unlicensed communications system of 5G is an urgent problem to be resolved.

Embodiments of this disclosure provide a search space configuration method and apparatus, and a communications system, which can achieve the purpose of flexibly configuring a search space for UE, to ensure that the UE can effectively receive a plurality of types of downlink control information in a timely manner.

Figure 2:
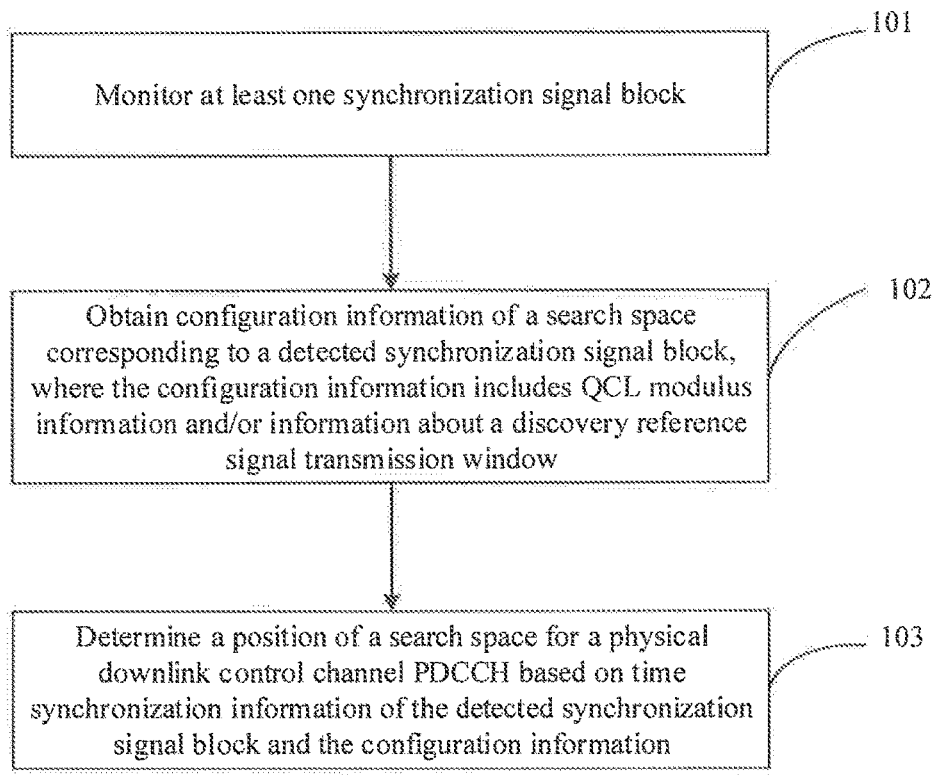
FIG. 2 is a schematic flowchart of a search space configuration method applied to user equipment according to an embodiment of this disclosure.

An embodiment of this disclosure provides a search space configuration method that is applied to user equipment. As shown in FIG. 2, the method includes the following steps.

Step 101: Monitor at least one synchronization signal block.

Step 102: Obtain configuration information of a search space corresponding to a detected synchronization signal block, where the configuration information includes QCL modulus information and/or information about a discovery reference signal transmission window.

Step 103: Determine a position of a search space for a physical downlink control channel PDCCH based on time synchronization information of the detected synchronization signal block and the configuration information.

In this embodiment, after detecting the synchronization signal block, the user equipment obtains the configuration information of the search space corresponding to the detected synchronization signal block, and determines the position of the search space for the PDCCH based on the time synchronization information of the detected synchronization signal block and the configuration information. In this way, flexible configuration of the search space for the UE can be implemented by using the configuration information, to ensure that the UE can effectively receive a plurality of types of downlink control information in a timely manner.

The information about the discovery reference signal transmission window may be specified by a protocol, preconfigured by a network-side device, or configured by a network-side device.

Optionally, the time synchronization information includes a position index, slot index, and/or frame index of the synchronization signal block.

The information about the discovery reference signal transmission window includes a position index of a smallest transmittable synchronization signal block and/or a position index of a largest transmittable synchronization signal block.

Optionally, the configuration information further includes at least one of the following:

a quantity of search spaces per slot;

a time offset; and an overlapping factor.

A value of the time offset may be 0, and a value of the overlapping factor may be 1/2.

Optionally, both the position index of the smallest transmittable synchronization signal block and the position index of the largest transmittable synchronization signal block are configurable; or the position index of the smallest transmittable synchronization signal block is 0, and the position index of the largest transmittable synchronization signal block is configurable; or the position index of the smallest transmittable synchronization signal block is 0, and the position index of the largest transmittable synchronization signal block is a largest synchronization signal block position index.

Optionally, the determining a position of a search space for a PDCCH based on time synchronization information of the detected synchronization signal block and the configuration information includes:

calculating a slot index and a frame index that are of the search space for the PDCCH corresponding to the detected synchronization signal block by using the slot index of the synchronization signal block, the position index of the synchronization signal block, the frame index of the synchronization signal block, the time offset, the QCL modulus information, the position index of the smallest transmittable synchronization signal block, the position index of the largest transmittable synchronization signal block, and/or a quantity of frames of a period for initial access.

Optionally, the slot index $n_0$ of the search space for the PDCCH corresponding to the detected synchronization signal block is calculated by using any one of the following formulas:

$$n_0 = [(n_{SSB,i}+0) + \Delta i * Q/2 + \lfloor i*M \rfloor] \bmod N_{slot}^{frame,\mu}, \text{ or}$$

$$n_0 = [(n_{SSB,i}) + \Delta i * Q/2 + \lfloor i/2 \rfloor] \bmod N_{slot}^{frame,\mu}; \text{ and}$$

the frame index $SFN_C$ of the search space for the PDCCH corresponding to the detected synchronization signal block is calculated by using the following formula: $SFN_C \bmod J = j$, where $J = \lfloor SFN_{SSB,i} + [(n_{SSB,i}+0) + \Delta i * Q/2 + \lfloor i*M \rfloor]/N_{slot}^{frame,\mu} \rfloor \bmod J$ or $j = \lfloor SFN_{SSB,i} + [(n_{SSB,i}) + \Delta i * Q/2 + \lfloor i/2 \rfloor] / N_{slot}^{frame,\mu} \rfloor \bmod J$, $\Delta i$ is an integer between $$\left\lceil \frac{y_{start}-i}{Q} \right\rceil \text{ and } \left\lfloor \frac{y_{end}-i}{Q} \right\rfloor$$

or an integer between $$\left\lceil (y_{start}-i) * \frac{k}{Q*2} \right\rceil \text{ and } \left\lfloor (y_{end}-i) * \frac{k}{Q*2} \right\rfloor,$$

$n_{SSB,i}$ is the slot index of the synchronization signal block, O is the time offset, Q is the QCL modulus information, i is the position index of the synchronization signal block, M is the overlapping factor, $N_{slot}^{frame,\mu}$ is a quantity of slots included in each frame, $y_{start}$ is the position index of the smallest transmittable synchronization signal block, $y_{end}$ is the position index of the largest transmittable synchronization signal block, $SFN_{SSB,i}$ is the frame index of the synchronization signal block, J is the quantity of frames of the period for initial access, and k is the quantity of search spaces per slot.

Optionally, values of $\Delta i$ are some integers between $$\left\lceil \frac{y_{start}-i}{Q} \right\rceil \text{ and } \left\lfloor \frac{y_{end}-i}{Q} \right\rfloor$$

or some integers between $$\left\lceil (y_{start}-i) * \frac{k}{Q*2} \right\rceil \text{ and } \left\lfloor (y_{end}-i) * \frac{k}{Q*2} \right\rfloor.$$

The values of Δi may be some integers in the foregoing value range, or may be all integers in the foregoing value range. The values of Δi may be consecutive integers in the foregoing value range, or may be non-consecutive integers in the foregoing value range.

Figure 3:
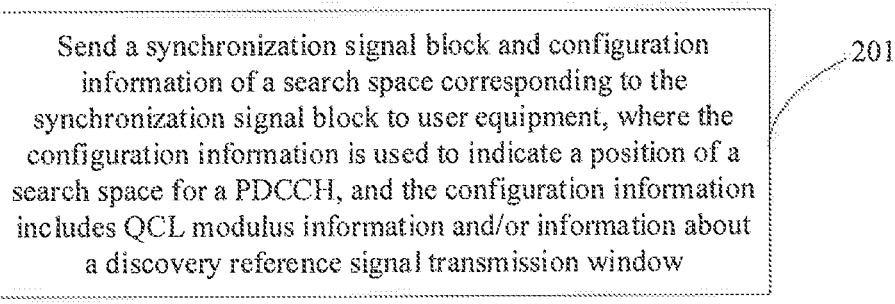
FIG. 3 is a schematic flowchart of a search space configuration method applied to a network-side device according to an embodiment of this disclosure.

An embodiment of this disclosure provides a search space configuration method that is applied to a network-side device. As shown in FIG. 3, the method includes the following step.

Step 201: Send a synchronization signal block and configuration information of a search space corresponding to the synchronization signal block to user equipment, where the configuration information is used to indicate a position of a search space for a PDCCH, and the configuration information includes QCL modulus information and/or information about a discovery reference signal transmission window.

In this embodiment, the network-side device sends the synchronization signal block and the configuration information of the search space corresponding to the synchronization signal block to the user equipment; and after detecting the synchronization signal block, the user equipment may determine the position of the search space for the PDCCH based on time synchronization information of the detected synchronization signal block and the configuration information. In this way, flexible configuration of the search space for the UE can be implemented to ensure that the UE can effectively receive a plurality of types of downlink control information in a timely manner.

Optionally, the time synchronization information includes a position index, slot index, and/or frame index of the synchronization signal block.

The information about the discovery reference signal transmission window includes a position index of a smallest transmittable synchronization signal block and/or a position index of a largest transmittable synchronization signal block.

Optionally, the configuration information further includes at least one of the following:
a quantity of search spaces per slot;
a time offset; and
an overlapping factor.

Specifically, a value of the time offset may be 0, and a value of the overlapping factor may be 1/2.

Optionally, both the position index of the smallest transmittable synchronization signal block and the position index of the largest transmittable synchronization signal block are configurable; or the position index of the smallest transmittable synchronization signal block is 0, and the position index of the largest transmittable synchronization signal block is configurable; or the position index of the smallest transmittable synchronization signal block is 0, and the position index of the largest transmittable synchronization signal block is a largest synchronization signal block position index.

In the technical solutions of this embodiment, the search space may be a Type-0 PDCCH common search space or a Type-0A PDCCH common search space.

For a Type-0 PDCCH CSS set, the Type-0 PDCCH CSS set may be configured in the following signaling: pdcch-ConfigSIB1 for an initial active BWP is configured in a MIB, PDCCH-ConfigCommon for the initial active BWP is configured in a SIB1, and PDCCH-ConfigCommon for an active DL BWP (including all RBs in the initial active BWP) that meets a specific condition is configured in radio resource control (RRC) signaling.

However, the UE is required to detect at least one SSB before all the configurations. The UE detects at least one SSB and obtains the following information.

(1) Time synchronization information, including a position index i of the SSB, a slot index $rl_{ssB4}$ of the SSB, and a frame index $SFN_{SSB,i}$ of the SSB.

(2) QCL modulus information Q, to be specific, a maximum quantity of different QCL assumptions that can exist in DRS transmission, or a maximum quantity of beams in which the network-side device sends a DRS.

(3) Information about a DRS transmission window, to be specific, a time range for transmitting the DRS, which is represented by a position index $y_{start}$ of a smallest transmittable SSB and a position index $y_{end}$ of a largest transmittable SSB, where
both $y_{start}$ and $y_{end}$ are configurable; or
$y_{start}=0$, and $y_{end}$ is configurable; or
both $y_{start}$ and $y_{end}$ are unconfigurable, $y_{start}=0$, and $y_{end}=Y$, where Y is a largest SSB position index; or
in a case that $y_{start}$ and $y_{end}$ are not configured, $y_{start}=0$, and $y_{end}=Y$.

(4) Optionally, the information obtained by the UE further includes a quantity k of search spaces per slot.

(5) Optionally, the information obtained by the UE further includes a time offset O and an overlapping factor M. For an NRU, O and M may be set to fixed values, to be specific, O=0, and M=1/2.

After obtaining the foregoing information, the UE can calculate a time domain position of a Type-0 PDCCH CSS set according to the following steps. Specifically, after detecting an SSB #i, the UE calculates a slot index $n_0$ and a frame index $SFN_C$ that are of a Type-0 PDCCH CSS set corresponding to the SSB #i based on the foregoing information. That is, all or some slots for SSBs that share a same QCL relationship with the detected SSB #i in a DRS transmission window are represented by the following formulas:

$$n_0 = [(n_{SSB,i}+0) + \Delta i * Q/2 + \lfloor i*M \rfloor] \bmod N_{slot}^{frame,\mu} \text{ or}$$

$$n_0 = [(n_{SSB,i}) + \Delta i * Q/2 + \lfloor i/2 \rfloor] \bmod N_{slot}^{frame,\mu}, \text{ where}$$

Δi is an integer between $$\left\lceil \frac{y_{start} - i}{Q} \right\rceil \text{ and } \left\lfloor \frac{y_{end} - i}{Q} \right\rfloor$$

or an integer between $$\left\lceil (y_{start} - i) * \frac{k}{Q*2} \right\rceil \text{ and } \left\lfloor (y_{end} - i) * \frac{k}{Q*2} \right\rfloor;$$

and $SFN_C$ meets $SFN_C \bmod J = j$, where $\lfloor SFN_{SSB,i} + [(n_{SSB,i}+0) + \Delta i*Q(2/+\lfloor i*M \rfloor]/N_{slot}^{frame,\mu} \rfloor \bmod J = j$ or $\lfloor SFN_{SSB,i} + [(n_{SSB,i}) + \Delta i*Q/2 + \lfloor i/2 \rfloor]/N_{slot}^{frame,\mu} \rfloor \bmod J = j$, and J is a quantity of frames of an assumed period for initial access. If the period is 20 ms, J=2. If the period is 40 ms, J=4.

As learned from the foregoing configurations, there are a plurality of PDCCH monitoring occasions (depending on a quantity of Δi) in the Type-0 PDCCH CSS set within one period, and the Type-0 PDCCH CSS set is corresponding to a specific QCL index.

For reducing a quantity of UE search times, a part of the foregoing slot index may be used for the Type-0 PDCCH CSS set, in other words, a value of Δi is limited, for example, Δi=0. A minimum value of Δi may be $$\left\lceil \frac{y_{start}-i}{Q} \right\rceil \text{ or } \left\lceil (y_{start}-i) * \frac{k}{Q*2} \right\rceil.$$

A maximum value of Δi may be $$\left\lfloor \frac{y_{end}-i}{Q} \right\rfloor \text{ or } \left\lfloor (y_{end}-i) * \frac{k}{Q*2} \right\rfloor.$$

Figure 4:
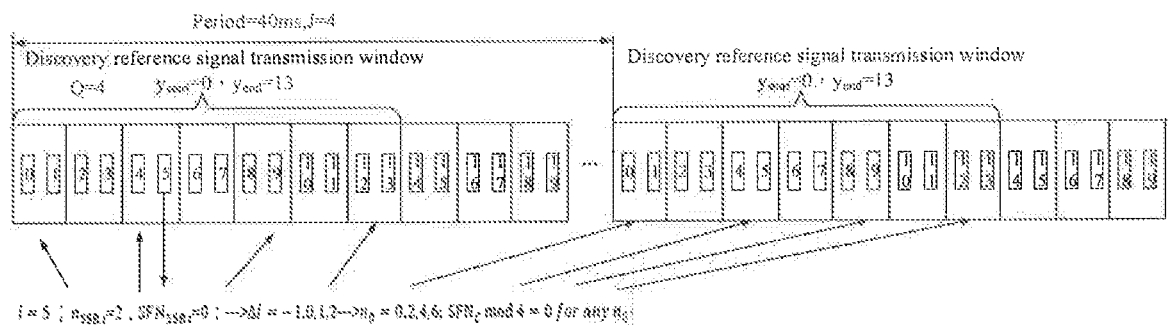
FIG. 4 is a schematic diagram of search space configuration according to a specific embodiment of this disclosure.

In a specific embodiment, it is assumed that the UE detects an SSB #5 and obtains a Type-0 PDCCH CSS set shown in FIG. 4, where i=5, $n_{SSB,i}=2$, and $SFN_{SSB,i}=0$. Through calculation, the UE may obtain that Δi=−1, 0, 1, and 2, and may further obtain that $n_0$=0, 2, 4, and 6, and $SFN_C$ mod 4=0 for any $n_0$. In this way, a position of a search space may be determined based on $n_0$ and $SFN_C$.

In this embodiment, for a search space used for scheduling OSI, a Type-0A PDCCH CSS set may be configured to be the same as the Type-0 PDCCH CSS set or to be a part of the Type-0 PDCCH CSS set, for example, specifying that Ai=0, or specifying that a minimum value of Δi may be $$\left\lceil \frac{y_{start}-i}{Q} \right\rceil \text{ or } \left\lceil (y_{start}-i) * \frac{k}{Q*2} \right\rceil,$$

and a maximum value of Δi may be $$\left\lfloor \frac{y_{end}-i}{Q} \right\rfloor \text{ or } \left\lfloor (y_{end}-i) * \frac{k}{Q*2} \right\rfloor.$$

If a plurality of types of OSI is allowed to be transmitted in one SI transmission window, when the Type-0A PDCCH CSS set is configured to be the Type-0 PDCCH CSS set, different types of OSI may be distinguished by different occasions in the Type-0 PDCCH CSS set. In a specific example, if a maximum of two types of OSI is allowed to be transmitted in one SI transmission window, a slot occasion position of a search space within one period is divided into two parts. For example, a first part is used for scheduling OSI with a small OSI index, and a second part is used for scheduling OSI with a large OSI index.

If a plurality of types of OSI is allowed to be transmitted in one SI transmission window, when the Type-0A PDCCH CSS set is configured to be a non-Type-0 PDCCH CSS set, two different search spaces may be configured, and different types of OSI may be distinguished by different search space IDs.

In a specific embodiment, it is assumed that the UE detects an SSB #5, a length of an SI transmission window for OSI is set to 40 ms, and OSI #0 and OSI #6 are transmitted in a first SI transmission window. In this case, the foregoing Type-0 PDCCH CSS set within one period is divided into two parts, to be specific, a position with $n_0$=0 and 4 is used for OSI #0 search, and a position with $n_0$=2 and 6 is used for OSI #6 search.

Figure 5:
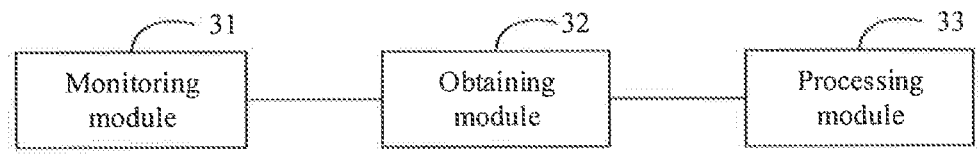
FIG. 5 is a structural block diagram of a search space configuration apparatus applied to user equipment according to an embodiment of this disclosure.

An embodiment of this disclosure further provides a search space configuration apparatus that is applied to user equipment. As shown in FIG. 5, the apparatus includes:

a monitoring module 31, configured to monitor at least one synchronization signal block;

an obtaining module 32, configured to obtain configuration information of a search space corresponding to a detected synchronization signal block, where the configuration information includes QCL modulus information and/or information about a discovery reference signal transmission window; and a processing module 33, configured to determine a position of a search space for a physical downlink control channel PDCCH based on time synchronization information of the detected synchronization signal block and the configuration information.

In this embodiment, after detecting the synchronization signal block, the user equipment obtains the configuration information of the search space corresponding to the detected synchronization signal block, and determines the position of the search space for the PDCCH based on the time synchronization information of the detected synchronization signal block and the configuration information. In this way, flexible configuration of the search space for the UE can be implemented by using the configuration information, to ensure that the UE can effectively receive a plurality of types of downlink control information in a timely manner.

Optionally, the information about the discovery reference signal transmission window is specified by a protocol or configured by a network-side device.

Optionally, the time synchronization information includes a position index, slot index, and/or frame index of the synchronization signal block.

The information about the discovery reference signal transmission window includes a position index of a smallest transmittable synchronization signal block and/or a position index of a largest transmittable synchronization signal block.

Optionally, the configuration information further includes at least one of the following:

a quantity of search spaces per slot;
a time offset; and
an overlapping factor.

Optionally, both the position index of the smallest transmittable synchronization signal block and the position index of the largest transmittable synchronization signal block are configurable; or the position index of the smallest transmittable synchronization signal block is 0, and the position index of the largest transmittable synchronization signal block is configurable; or the position index of the smallest transmittable synchronization signal block is 0, and the position index of the largest transmittable synchronization signal block is a largest synchronization signal block position index.

Optionally, the time offset is 0, and the overlapping factor is 1/2.

Optionally, the processing module 33 is specifically configured to: calculate a slot index and a frame index that are of the search space for the PDCCH corresponding to the detected synchronization signal block by using the slot index of the synchronization signal block, the position index of the synchronization signal block, the frame index of the synchronization signal block, the time offset, the QCL modulus information, the position index of the smallest transmittable synchronization signal block, the position index of the largest transmittable synchronization signal block, and/or a quantity of frames of a period for initial access.

Optionally, the processing module 33 is specifically configured to: calculate the slot index $n_0$ of the search space for the PDCCH corresponding to the detected synchronization signal block by using any one of the following formulas:

$$n_0 = [(n_{SSB,i} + O) + \Delta i * Q/2 + \lfloor i*M \rfloor] \bmod N_{slot}^{frame,\mu}, \text{ or}$$

$$n_0 = [(n_{SSB,i}) + \Delta i * Q/2 + \lfloor i/2 \rfloor] \bmod N_{slot}^{frame,\mu}; \text{ and}$$

calculate the frame index $SFN_C$ of the search space for the PDCCH corresponding to the detected synchronization signal block by using the following formula: $SFN_C \bmod j = j$, where $j = \lfloor SFN_{SSB,i} + [(n_{SSB,i} + O) + \Delta i * Q/2 + \lfloor i*M \rfloor] / N_{slot}^{frame,\mu} \rfloor \bmod J$ or $j = \lfloor SFN_{SSB,i} + [(n_{SSB,i}) + \Delta i * Q/2 + \lfloor i/2 \rfloor] / N_{slot}^{frame,\mu} \rfloor \bmod J$, $\Delta i$ is an integer between $$\left\lceil \frac{y_{start} - i}{Q} \right\rceil \text{ and } \left\lfloor \frac{y_{end} - i}{Q} \right\rfloor$$

or an integer between $$\left\lceil (y_{start} - i) * \frac{k}{Q*2} \right\rceil \text{ and } \left\lfloor (y_{end} - i) * \frac{k}{Q*2} \right\rfloor,$$

$n_{SSB,i}$ is the slot index of the synchronization signal block, O is the time offset, Q is the QCL modulus information, i is the position index of the synchronization signal block, M is the overlapping factor, $N_{slot}^{frame,\mu}$ is a quantity of slots included in each frame, $y_{start}$ is the position index of the smallest transmittable synchronization signal block, $y_{end}$ is the position index of the largest transmittable synchronization signal block, $SFN_{SSB,i}$ is the frame index of the synchronization signal block, J is the quantity of frames of the period for initial access, and k is the quantity of search spaces per slot.

Optionally, values of $\Delta i$ are some integers between $$\left\lceil \frac{y_{start} - i}{Q} \right\rceil \text{ and } \left\lfloor \frac{y_{end} - i}{Q} \right\rfloor$$

or some integers between $$\left\lceil (y_{start} - i) * \frac{k}{Q*2} \right\rceil \text{ and } \left\lfloor (y_{end} - i) * \frac{k}{Q*2} \right\rfloor.$$

The values of $\Delta i$ may be some integers in the foregoing value range, or may be all integers in the foregoing value range. The values of $\Delta i$ may be consecutive integers in the foregoing value range, or may be non-consecutive integers in the foregoing value range.

Optionally, the search space is a Type-0 PDCCH common search space or a Type-0A PDCCH common search space.

Optionally, when the search space is a Type-0A PDCCH common search space, and a plurality of types of other system information OSI is allowed to be transmitted in one system information transmission window, search spaces that are used for scheduling two different types of OSI occupy different slots within a same search space period.

Figure 6:
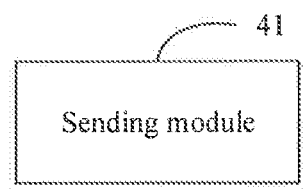
FIG. 6 is a structural block diagram of a search space configuration apparatus applied to a network-side device according to an embodiment of this disclosure.

An embodiment of this disclosure further provides a search space configuration apparatus that is applied to a network-side device. As shown in FIG. 6, the apparatus includes:

a sending module 41, configured to send a synchronization signal block and configuration information of a search space corresponding to the synchronization signal block to user equipment, where the configuration information is used to indicate a position of a search space for a PDCCH, and the configuration information includes QCL modulus information and/or information about a discovery reference signal transmission window.

In this embodiment, the network-side device sends the synchronization signal block and the configuration information of the search space corresponding to the synchronization signal block to the user equipment; and after detecting the synchronization signal block, the user equipment may determine the position of the search space for the PDCCH based on time synchronization information of the detected synchronization signal block and the configuration information. In this way, flexible configuration of the search space for the UE can be implemented to ensure that the UE can effectively receive a plurality of types of downlink control information in a timely manner.

Optionally, the time synchronization information includes a position index, slot index, and/or frame index of the synchronization signal block.

The information about the discovery reference signal transmission window includes a position index of a smallest transmittable synchronization signal block and/or a position index of a largest transmittable synchronization signal block.

Optionally, the configuration information further includes at least one of the following:

a quantity of search spaces per slot;

a time offset; and an overlapping factor.

Optionally, both the position index of the smallest transmittable synchronization signal block and the position index of the largest transmittable synchronization signal block are configurable; or the position index of the smallest transmittable synchronization signal block is 0, and the position index of the largest transmittable synchronization signal block is configurable; or the position index of the smallest transmittable synchronization signal block is 0, and the position index of the largest transmittable synchronization signal block is a largest synchronization signal block position index.

Optionally, the time offset is 0, and the overlapping factor is 1/2.

An embodiment of this disclosure further provides a communications device, including a memory, a processor, and a computer program stored in the memory and capable of running on the processor, where when the computer program is executed by the processor, the steps of the foregoing search space configuration method are implemented.

The communications device may be user equipment or a network-side device.

Figure 7:
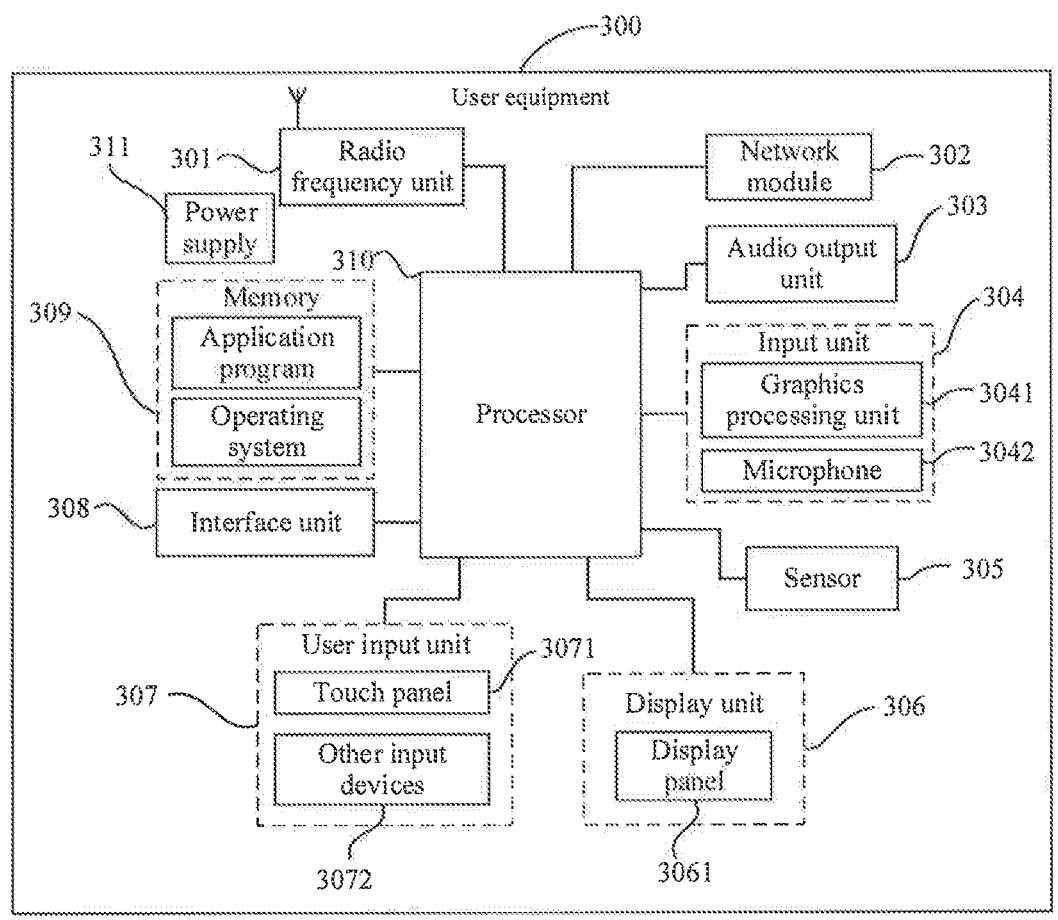
FIG. 7 is a schematic diagram of composition of user equipment according to an embodiment of this disclosure.

When the communications device is user equipment, as shown in FIG. 7, the user equipment 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. Persons skilled in the art can understand that the structure of the user equipment shown in FIG. 7 does not constitute any limitation on the user equipment. The user equipment may include more or fewer components than those shown in the figure, or may combine some components, or may have a different component arrangement. In this embodiment of this disclosure, the user equipment includes but is not limited to a mobile phone, a tablet computer, a laptop computer, a palmtop computer, an in-vehicle terminal, a wearable device, a pedometer, and the like.

The processor 310 is configured to: monitor at least one synchronization signal block; obtain configuration information of a search space corresponding to a detected synchronization signal block, where the configuration information includes QCL modulus information and/or information about a discovery reference signal transmission window; and determine a position of a search space for a physical downlink control channel PDCCH based on time synchronization information of the detected synchronization signal block and the configuration information.

Further, the information about the discovery reference signal transmission window is specified by a protocol or configured by a network-side device.

Further, the time synchronization information includes a position index, slot index, and/or frame index of the synchronization signal block.

The information about the discovery reference signal transmission window includes a position index of a smallest transmittable synchronization signal block and/or a position index of a largest transmittable synchronization signal block.

Further, the configuration information further includes at least one of the following:
 a quantity of search spaces per slot;
 a time offset; and
 an overlapping factor.

Further, both the position index of the smallest transmittable synchronization signal block and the position index of the largest transmittable synchronization signal block are configurable; or the position index of the smallest transmittable synchronization signal block is 0, and the position index of the largest transmittable synchronization signal block is configurable; or the position index of the smallest transmittable synchronization signal block is 0, and the position index of the largest transmittable synchronization signal block is a largest synchronization signal block position index.

Further, the time offset is 0, and the overlapping factor is 1/2.

Further, the processor 310 is specifically configured to: calculate a slot index and a frame index that are of the search space for the PDCCH corresponding to the detected synchronization signal block by using the slot index of the synchronization signal block, the position index of the synchronization signal block, the frame index of the synchronization signal block, the time offset, the QCL modulus information, the position index of the smallest transmittable synchronization signal block, the position index of the largest transmittable synchronization signal block, and/or a quantity of frames of a period for initial access.

Further, the processor 310 is specifically configured to: calculate the slot index $n_0$ of the search space for the PDCCH corresponding to the detected synchronization signal block by using any one of the following formulas:

$$n_0 = [(n_{SSB,i} + O) + \Delta i * Q/2 + \lfloor i*M \rfloor] \bmod N_{slot}^{frame,\mu}, \text{ or}$$

$$n_0 = [(n_{SSB,i}) + \Delta i * Q/2 + \lfloor i/2 \rfloor] \bmod N_{slot}^{frame,\mu}; \text{ and}$$

calculate the frame index $SFN_C$ of the search space for the PDCCH corresponding to the detected synchronization signal block by using the following formula: $SFN_C \bmod J = j$, where $j = \lfloor SFN_{SSB,i} + [(n_{SSB,i} + O) + \Delta i * Q/2 + \lfloor i*M \rfloor]/N_{slot}^{frame,\mu} \rfloor \bmod J$ or $j = \lfloor SFN_{SSB,i} + [(n_{SSB,i}) + \Delta i * Q/2 + \lfloor i/2 \rfloor]/N_{slot}^{frame,\mu} \rfloor \bmod J$, $\Delta i$ is an integer between $$\lceil \frac{y_{start} - i}{Q} \rceil \text{ and } \lfloor \frac{y_{end} - i}{Q} \rfloor$$

or an integer between $$\lceil (y_{start} - i) * \frac{k}{Q*2} \rceil \text{ and } \lfloor (y_{end} - i) * \frac{k}{Q*2} \rfloor,$$

$n_{SSB,i}$ is the slot index of the synchronization signal block, O is the time offset, Q is the QCL modulus information, i is the position index of the synchronization signal block, M is the overlapping factor, $N_{slot}^{frame,\mu}$ is a quantity of slots included in each frame, $y_{start}$ is the position index of the smallest transmittable synchronization signal block, $y_{end}$ is the position index of the largest transmittable synchronization signal block, $SFN_{SSB,i}$ is the frame index of the synchronization signal block, J is the quantity of frames of the period for initial access, and k is the quantity of search spaces per slot.

Further, values of $\Delta i$ are some integers between $$\lceil \frac{y_{start} - i}{Q} \rceil \text{ and } \lfloor \frac{y_{end} - i}{Q} \rfloor$$

or some integers between $$\lceil (y_{start} - i) * \frac{k}{Q*2} \rceil \text{ and } \lfloor (y_{end} - i) * \frac{k}{Q*2} \rfloor.$$

Further, the search space is a Type-0 PDCCH common search space or a Type-0A PDCCH common search space.

Further, when the search space is a Type-0A PDCCH common search space, and a plurality of types of other system information OSI is allowed to be transmitted in one system information transmission window, search spaces that are used for scheduling two different types of OSI occupy different slots within a same search space period.

It should be understood that in this embodiment of this disclosure, the radio frequency unit 301 may be configured to transmit or receive a signal in an information transmitting/receiving or call process. Specifically, the radio frequency unit 301 receives downlink data from a base station and transmits the downlink data to the processor 310 for processing; and transmits uplink data to the base station. Usually, the radio frequency unit 301 includes but is not limited to an antenna, at least one amplifier, a transceiver, a coupler, a low noise amplifier, a duplexer, and the like. In addition, the radio frequency unit 301 may further communicate with a network and other devices through a wireless communications system.

The user equipment provides a user with wireless broadband Internet access by using the network module 302, for example, helping the user send and receive emails, browse web pages, or access streaming media.

The audio output unit 303 may convert audio data received by the radio frequency unit 301 or the network module 302 or stored in the memory 309 into an audio signal and output the audio signal as a sound. Moreover, the audio output unit 303 may also provide an audio output (for example, a call signal reception sound or a message reception sound) related to a specific function performed by the user equipment 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a static picture or a video that is obtained by an image capture apparatus (for example, a camera) in a video capture mode or an image capture mode. A processed image frame may be displayed on the display unit 306. An image frame processed by the graphics processing unit 3041 may be stored in the memory 309 (or another storage medium), or may be transmitted by the radio frequency unit 301 or the network module 302. The microphone 3042 is capable of receiving a sound and processing such sound into audio data. In a phone call mode, the processed audio data may be converted into a format for transmission by the radio frequency unit 301 to a mobile communications base station, and output as such.

The user equipment 300 further includes at least one sensor 305, for example, an optical sensor, a motion sensor, and other sensors. Specifically, the optical sensor includes an ambient light sensor and a proximity sensor. The ambient light sensor may adjust luminance of the display panel 3061 based on brightness of ambient light. The proximity sensor may turn off the display panel 3061 and/or backlight when the user equipment 300 approaches an ear. As a type of motion sensor, an accelerometer sensor can detect magnitudes of accelerations in all directions (usually, three axes), can detect a magnitude and a direction of gravity when the user equipment is in a static state, and can be applied to user equipment posture recognition (for example, landscape/portrait mode switching, related games, and magnetometer posture calibration), functions related to vibration recognition (for example, pedometer or tapping), and the like. The sensor 305 may further include a fingerprint sensor, a pressure sensor, an iris sensor, a molecular sensor, a gyroscope, a barometer, a hygrometer, a thermometer, an infrared sensor, or the like. Details are not described herein.

The display unit 306 is configured to display information input by the user or information provided to the user. The display unit 306 may include the display panel 3061. The display panel 3061 may be configured in a form of a liquid crystal display (LCD), an organic light-emitting diode (OLED), or the like.

The user input unit 307 may be configured to receive input digit or character information, and generate a key signal input related to a user setting and function control of the user equipment. Specifically, the user input unit 307 includes a touch panel 3071 and other input devices 3072. The touch panel 3071 is also referred to as a touchscreen, and may collect a touch operation of the user on or near the touch panel 3071 (for example, an operation performed on or near the touch panel 3071 by the user by using any appropriate object or accessory such as a finger or a stylus). The touch panel 3071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, sends the touch point coordinates to the processor 310, and receives and executes a command sent by the processor 310. In addition, the touch panel 3071 may be implemented in a plurality of forms, for example, as a resistive, capacitive, infrared, or surface acoustic wave touch panel. In addition to the touch panel 3071, the user input unit 307 may further include the other input devices 3072. Specifically, the other input devices 3072 may include but are not limited to a physical keyboard, a function key (for example, a volume control key or a power on/off key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 to determine a type of the touch event. Then, the processor 310 provides a corresponding visual output on the display panel 3061 based on the type of the touch event. Although in FIG. 6, the touch panel 3071 and the display panel 3061 act as two separate parts to implement input and output functions of the user equipment, in some embodiments, the touch panel 3071 and the display panel 3061 may be integrated to implement the input and output functions of the user equipment. This is not specifically limited herein.

The interface unit 308 is an interface between an external apparatus and the user equipment 300. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 308 may be configured to receive an input (for example, data information or power) from the external apparatus and transmit the received input to one or more elements of the user equipment 300, or transmit data between the external apparatus and the user equipment 300.

The memory 309 may be configured to store software programs and various data. The memory 309 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 309 may include a high-speed random access memory, and may further include a nonvolatile memory, for example, at least one magnetic disc storage device or a flash memory device, or other volatile solid-state storage devices.

The processor 310, as a control center of the user equipment, is connected to all parts of the entire user equipment by using various interfaces and lines. By running or executing a software program and/or module that is stored in the memory 309 and invoking data stored in the memory 309, the processor 310 executes various functions of the user equipment and processes data, so as to perform overall monitoring on the user equipment. The processor 310 may include one or more processing units. Optionally, the processor 310 may integrate an application processor and a modem processor. The application processor mainly processes the operating system, a user interface, an application program, and the like. The modem processor mainly processes wireless communication. It can be understood that the modem processor may alternatively not be integrated into the processor 310.

The user equipment 300 may further include the power supply 311 (for example, a battery) for supplying power to the components. Optionally, the power supply 311 may be logically connected to the processor 310 through a power management system. In this way, functions such as charge management, discharge management, and power consumption management are implemented by using the power management system.

In addition, the user equipment 300 includes some functional modules not shown. Details are not described herein.

Figure 8:
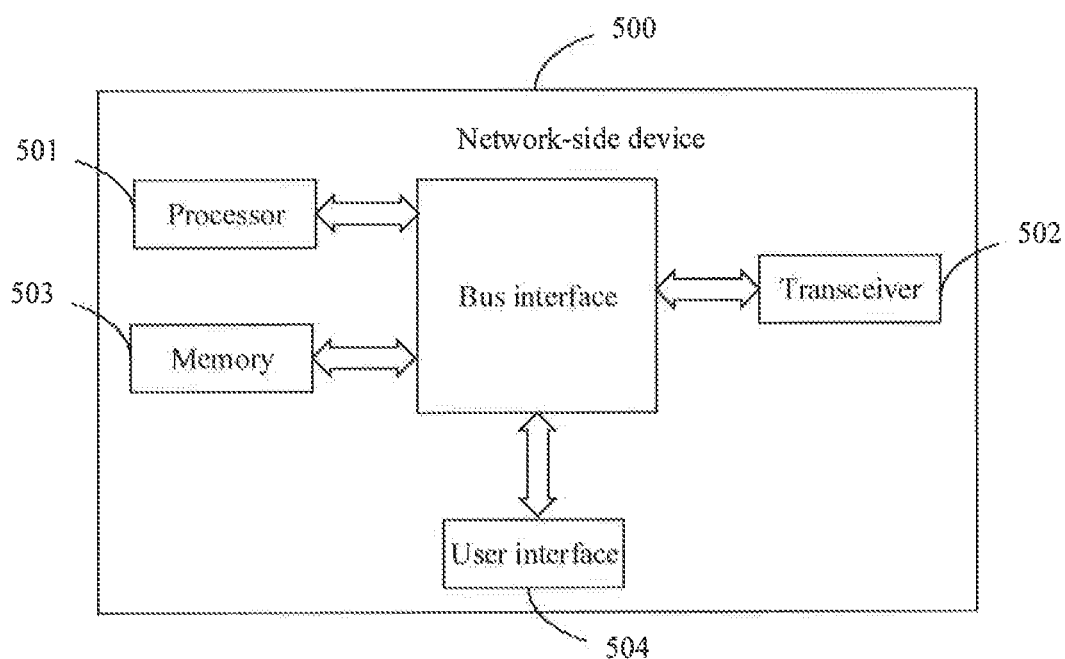
FIG. 8 is a schematic diagram of composition of a network-side device according to an embodiment of this disclosure.

When the communications device is a network-side device, as shown in FIG. 8, the network-side device 500 includes a processor 501, a transceiver 502, a memory 503, a user interface 504, and a bus interface.

In this embodiment of this disclosure, the network-side device 500 further includes a computer program stored in the memory 503 and capable of running on the processor 501. When the computer program is executed by the processor 501, the following step is implemented: sending a synchronization signal block and configuration information of a search space corresponding to the synchronization signal block to user equipment, where the configuration information is used to indicate a position of a search space for a PDCCH, and the configuration information includes QCL modulus information and/or information about a discovery reference signal transmission window.

In FIG. 8, a bus architecture may include any number of interconnected buses and bridges, and specifically connect together various circuits of one or more processors represented by the processor 501 and a memory represented by the memory 503. The bus architecture may further interconnect various other circuits such as a peripheral device, a voltage regulator, and a power management circuit. These are all common sense in the art, and therefore are not further described in this specification. The bus interface provides interfaces. The transceiver 502 may be a plurality of elements, including a transmitter and a receiver, and provides units configured to communicate with various other apparatuses over a transmission medium. For different user equipment, the user interface 504 may also be an interface capable of externally or internally connecting a required device, and the connected device includes but is not limited to a keypad, a display, a speaker, a microphone, a joystick, and the like.

The processor 501 is responsible for management of the bus architecture and general processing, and the memory 503 may store data for use by the processor 501 when the processor 501 performs an operation.

Further, time synchronization information includes a position index, slot index, and/or frame index of the synchronization signal block.

The information about the discovery reference signal transmission window includes a position index of a smallest transmittable synchronization signal block and/or a position index of a largest transmittable synchronization signal block.

Further, the configuration information further includes at least one of the following:
a quantity of search spaces per slot;
a time offset; and
an overlapping factor.

Further, both the position index of the smallest transmittable synchronization signal block and the position index of the largest transmittable synchronization signal block are configurable; or the position index of the smallest transmittable synchronization signal block is 0, and the position index of the largest transmittable synchronization signal block is configurable; or the position index of the smallest transmittable synchronization signal block is 0, and the position index of the largest transmittable synchronization signal block is a largest synchronization signal block position index.

Further, the time offset is 0, and the overlapping factor is 1/2.

An embodiment of this disclosure further provides a computer-readable storage medium, where a computer program is stored in the computer-readable storage medium. When the computer program is executed by a processor, the steps of the foregoing search space configuration method are implemented.

It can be understood that the embodiments described in this specification may be implemented by hardware, software, firmware, middleware, microcode, or a combination thereof. For hardware implementation, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for performing the functions described in this application, or a combination thereof For software implementation, the technology described herein may be implemented by executing modules (for example, procedures and functions) of the functions described herein. Software code may be stored in the memory and executed by the processor. The memory may be implemented in or outside the processor.

All embodiments in this specification are described in a progressive manner, with each embodiment focusing what is different from other embodiments. For same or similar parts in the embodiments, mutual reference may be made.

Persons skilled in the art should understand that the embodiments of this disclosure may be provided as a method, an apparatus, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These computer program instructions may also be stored in a computer-readable memory that can direct the computer or any other programmable data processing user equipment to work in a specific manner, so that the instructions stored in the computer-readable memory produce an artifact that includes an instruction apparatus. The instruction apparatus implements a specific function in one or more processes in the flowcharts and/or in one or more blocks in the block diagrams.

These computer program instructions may be loaded onto a computer or other programmable data processing user equipment, so that a series of operations and steps are performed on the computer or the other programmable user equipment, thereby generating computer-implemented processing. Therefore, the instructions executed on the computer or the other programmable user equipment provide steps for implementing the functions specified in one or more processes in the flowcharts and/or in one or more blocks in the block diagrams.

Although some preferred embodiments of the embodiments of this disclosure have been described, persons skilled in the art can make changes and modifications to these embodiments once they learn the basic inventive concept. Therefore, the following claims are intended to be construed as to cover the preferred embodiments and all changes and modifications falling within the scope of the embodiments of this disclosure.

It should be further noted that in this specification, relational terms such as "first" and "second" are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, such that a process, a method, an article, or user equipment that includes a list of elements not only includes those elements but also includes other elements that are not expressly listed, or further includes elements inherent to such a process, method, article, or user equipment. In absence of more constraints, an element preceded by "includes a..." does not preclude the existence of other identical elements in the process, method, article, or user equipment that includes the element.

The foregoing descriptions are preferred embodiments of this disclosure. It should be noted that persons of ordinary skill in the art may make several improvements or refinements without departing from the principle of this disclosure and the improvements or refinements shall fall within the protection scope of this disclosure.

What is claimed is:

1. A search space configuration method, comprising:
monitoring, by a user equipment, at least one synchronization signal block;
obtaining, by the user equipment, configuration information of a search space corresponding to a monitored synchronization signal block, wherein the configuration information comprises quasi co-location (QCL) modulus information and/or information about a discovery reference signal transmission window, the information about the discovery reference signal transmission window comprises a position index of a smallest transmittable synchronization signal block and/or a position index of a largest transmittable synchronization signal block; and determining, by the user equipment, a position of a search space for a physical downlink control channel (PDCCH) based on time synchronization information of the monitored synchronization signal block and the configuration information;
wherein the time synchronization information comprises a position index, slot index, and/or frame index of the synchronization signal block; and the determining by the user equipment a position of a search space for a PDCCH based on time synchronization information of the monitored synchronization signal block and the configuration information comprises:
calculating, by the user equipment, a slot index and a frame index that are of the search space for the PDCCH corresponding to the monitored synchronization signal block by using the slot index of the synchronization signal block, the position index of the synchronization signal block, the frame index of the synchronization signal block, the time offset, the QCL modulus information, the position index of the smallest transmittable synchronization signal block, the position index of the largest transmittable synchronization signal block, and a quantity of frames of a period for initial access.

2. The search space configuration method according to claim 1, wherein the information about the discovery reference signal transmission window is specified by a protocol or configured by a network-side device.

3. The search space configuration method according to claim 1, wherein the configuration information further comprises at least one of the following:
a quantity of search spaces per slot;
a time offset; and
an overlapping factor.

4. The search space configuration method according to claim 3, wherein the time offset is 0, and the overlapping factor is 1/2.

5. The search space configuration method according to claim 1, wherein
both the position index of the smallest transmittable synchronization signal block and the position index of the largest transmittable synchronization signal block are configurable; or
the position index of the smallest transmittable synchronization signal block is 0, and the position index of the largest transmittable synchronization signal block is configurable; or
the position index of the smallest transmittable synchronization signal block is 0, and the position index of the largest transmittable synchronization signal block is a largest synchronization signal block position index.

6. The search space configuration method according to claim 1, wherein the slot index $n_0$ of the search space for the PDCCH corresponding to the monitored synchronization signal block is calculated by using any one of the following formulas:

$$n_0 = [(n_{SSB,i} + O) + \Delta i * Q/2 + \lfloor i * M \rfloor] \bmod N_{slot}^{frame,\mu}, \text{ or}$$

$$n_0 = [(n_{SSB,i}) + \Delta i * Q/2 + \lfloor i/2 \rfloor] \bmod N_{slot}^{frame,\mu}; \text{ and}$$

the frame index $SFN_C$ of the search space for the PDCCH corresponding to the monitored synchronization signal block is calculated by using the following formula:

$SFN_C \bmod J = j$, wherein $j = \lfloor SFN_{SSB,i} + [(n_{SSB,i} + O) + \Delta i * Q/2 + \lfloor i * M \rfloor]/N_{slot}^{frame,\mu} \rfloor \bmod J$ or $j = \lfloor SFN_{SSB,i} + [(n_{SSB,i}) + \Delta i * Q/2 + \lfloor i/2 \rfloor]/N_{slot}^{frame,\mu} \rfloor \bmod J$, $\Delta i$ is an integer between $$\left\lceil \frac{y_{start}-i}{Q} \right\rceil \text{ and } \left\lfloor \frac{y_{end}-i}{Q} \right\rfloor$$

or an integer between $$\left\lceil (y_{start}-i)*\frac{k}{Q*2} \right\rceil \text{ and } \left\lfloor (y_{end}-i)*\frac{k}{Q*2} \right\rfloor,$$

$n_{SSB,i}$ is the slot index of the synchronization signal block, O is the time offset, Q is the QCL modulus information, i is the position index of the synchronization signal block, M is the overlapping factor, $N_{slot}^{frame,\mu}$ is a quantity of slots comprised in each frame, $y_{start}$ is the position index of the smallest transmittable synchronization signal block, $y_{end}$ is the position index of the largest transmittable synchronization signal block, $SFN_{SSB,i}$ is the frame index of the synchronization signal block, J is the quantity of frames of the period for initial access, and k is the quantity of search spaces per slot.

7. The search space configuration method according to claim 6, wherein values of Δi are some integers between $$\left\lceil \frac{y_{start}-i}{Q} \right\rceil \text{ and } \left\lfloor \frac{y_{end}-i}{Q} \right\rfloor$$

or some integers between $$\left\lceil (y_{start}-i)*\frac{k}{Q*2} \right\rceil \text{ and } \left\lfloor (y_{end}-i)*\frac{k}{Q*2} \right\rfloor.$$

8. The search space configuration method according to claim 1, wherein the search space is a Type-0 PDCCH common search space or a Type-0A PDCCH common search space.

9. The search space configuration method according to claim 8, wherein when the search space is a Type-0A PDCCH common search space, and a plurality of types of other system information OSI is allowed to be transmitted in one system information window, search spaces that are used for scheduling two different types of OSI occupy different slots within a same search space period.

10. A user equipment, comprising: a memory, a processor, and a computer program stored in the memory, wherein when the computer program is executed by the processor, following steps of a search space configuration method are implemented:
monitoring at least one synchronization signal block;
obtaining configuration information of a search space corresponding to a monitored synchronization signal block, wherein the configuration information comprises quasi co-location (QCL) modulus information and/or information about a discovery reference signal transmission window, the information about the discovery reference signal transmission window comprises a position index of a smallest transmittable synchronization signal block and/or a position index of a largest transmittable synchronization signal block; and
determining a position of a search space for a physical downlink control channel (PDCCH) based on time synchronization information of the monitored synchronization signal block and the configuration information;
wherein the time synchronization information comprises a position index, slot index, and/or frame index of the synchronization signal block; and the determining by the user equipment a position of a search space for a PDCCH based on time synchronization information of the monitored synchronization signal block and the configuration information comprises:
calculating, by the user equipment, a slot index and a frame index that are of the search space for the PDCCH corresponding to the monitored synchronization signal block by using the slot index of the synchronization signal block, the position index of the synchronization signal block, the frame index of the synchronization signal block, the time offset, the QCL modulus information, the position index of the smallest transmittable synchronization signal block, the position index of the largest transmittable synchronization signal block, and a quantity of frames of a period for initial access.

11. The user equipment according to claim 10, wherein the information about the discovery reference signal transmission window is specified by a protocol or configured by a network-side device.

12. The user equipment according to claim 10, wherein the configuration information further comprises at least one of the following:
a quantity of search spaces per slot;
a time offset; and
an overlapping factor.

13. The user equipment according to claim 12, wherein the time offset is 0, and the overlapping factor is 1/2.

14. The user equipment according to claim 10, wherein
both the position index of the smallest transmittable synchronization signal block and the position index of the largest transmittable synchronization signal block are configurable; or
the position index of the smallest transmittable synchronization signal block is 0, and the position index of the largest transmittable synchronization signal block is configurable; or
the position index of the smallest transmittable synchronization signal block is 0, and the position index of the largest transmittable synchronization signal block is a largest synchronization signal block position index.

15. The user equipment according to claim 10, wherein the slot index $n_0$ of the search space for the PDCCH corresponding to the monitored synchronization signal block is calculated by using any one of the following formulas:

$$n_0 = [(n_{SSB,i}+O)+\Delta i*Q/2+\lfloor i*M \rfloor] \bmod N_{slot}^{frame,\mu}, \text{ or}$$

$$n_0 = [(n_{SSB,i})+\Delta i*Q/2+\lfloor i/2 \rfloor] \bmod N_{slot}^{frame,\mu}; \text{ and}$$

the frame index $SFN\backslash i_C$ of the search space for the PDCCH corresponding to the monitored synchronization signal block is calculated by using the following formula:

$SFN_C \bmod J = j$, wherein $j = \lfloor SFN_{SSB,i} + [(n_{SSB,i}+O)+\Delta i*Q/2+\lfloor i*M \rfloor]/N_{slot}^{frame,\mu} \rfloor$ mod J or $j = \lfloor SFN_{SSB,i}+[(n_{SSB,i})+\Delta i*Q/2+\lfloor i/2 \rfloor]/N_{slot}^{frame,\mu} \rfloor$ mod J, Δi is an integer between $$\left\lceil \frac{y_{start} - i}{Q} \right\rceil \text{ and } \left\lfloor \frac{y_{end} - i}{Q} \right\rfloor$$

or an integer between $$\left\lceil (y_{start} - i) * \frac{k}{Q*2} \right\rceil \text{ and } \left\lfloor (y_{end} - i) * \frac{k}{Q*2} \right\rfloor,$$

$n_{SSB,i}$ is the slot index of the synchronization signal block, O is the time offset, Q is the QCL modulus information, i is the position index of the synchronization signal block, M is the overlapping factor, $N_{slot}^{frame,\mu}$ is a quantity of slots comprised in each frame, $y_{start}$ is the position index of the smallest transmittable synchronization signal block, $y_{end}$ is the position index of the largest transmittable synchronization signal block, $SFN_{SSB,i}$ is the frame index of the synchronization signal block, J is the quantity of frames of the period for initial access, and k is the quantity of search spaces per slot.

16. A network side device, comprising: a memory, a processor, and a computer program stored in the memory, wherein when the computer program is executed by the processor, a following step of a search space configuration method is implemented:

sending a synchronization signal block and configuration information of a search space corresponding to the synchronization signal block to user equipment, wherein the configuration information is used to indicate a position of a search space for a physical downlink control channel (PDCCH), and the configuration information comprises quasi co-location (QCL) modulus information and/or information about a discovery reference signal transmission window, the information about the discovery reference signal transmission window comprises a position index of a smallest transmittable synchronization signal block and/or a position index of a largest transmittable synchronization signal block; and sending time synchronization information of the synchronization signal block to the user equipment;

wherein the time synchronization information comprises a position index, slot index, and/or frame index of the synchronization signal block, such that the user equipment is enabled to calculate a slot index and a frame index that are of the search space for the PDCCH corresponding to the synchronization signal block by using the slot index of the synchronization signal block, the position index of the synchronization signal block, the frame index of the synchronization signal block, the time offset, the QCL modulus information, the position index of the smallest transmittable synchronization signal block, the position index of the largest transmittable synchronization signal block, and a quantity of frames of a period for initial access.

17. The network side device according to claim 16, wherein the configuration information further comprises at least one of the following:

a quantity of search spaces per slot;
a time offset; and
an overlapping factor.

18. The network side device according to claim 17, wherein the time offset is 0, and the overlapping factor is 1/2.

* * * * *